United States Patent
Berthet et al.

(10) Patent No.: US 8,336,283 B2
(45) Date of Patent: Dec. 25, 2012

(54) FRUIT HARVESTING MACHINE HAVING A MOTORISED SUPPORT STRUCTURE AND SUSPENSION FRAME

(75) Inventors: Jean-Paul Berthet, La Chaize Giraud (FR); Thierry Le Briquer, Coëx (FR)

(73) Assignee: CNH America LLC, New Holland, PA (US)

(*) Notice: Subject to any disclaimer, the term of this patent is extended or adjusted under 35 U.S.C. 154(b) by 0 days.

(21) Appl. No.: 12/998,523

(22) PCT Filed: Oct. 27, 2009

(86) PCT No.: PCT/EP2009/064162
§ 371 (c)(1),
(2), (4) Date: Jun. 3, 2011

(87) PCT Pub. No.: WO2010/049429
PCT Pub. Date: May 6, 2010

(65) Prior Publication Data
US 2011/0232256 A1  Sep. 29, 2011

(30) Foreign Application Priority Data

Oct. 27, 2008 (FR) ..................................... 08 05993

(51) Int. Cl.
*A01D 46/00* (2006.01)
(52) U.S. Cl. ...................................................... 56/340.1
(58) Field of Classification Search ................ 56/340.1, 56/330, 329, 328.1, 333
See application file for complete search history.

(56) References Cited

U.S. PATENT DOCUMENTS

| | | | | |
|---|---|---|---|---|
| 3,685,264 | A | | 8/1972 | Littau |
| 4,173,859 | A | * | 11/1979 | Goldsmith et al. ............. 56/330 |
| 4,179,871 | A | * | 12/1979 | Claxton ......................... 56/330 |
| 4,194,347 | A | * | 3/1980 | Peters ........................ 56/340.1 |
| 4,336,682 | A | * | 6/1982 | Orlando ......................... 56/330 |
| 4,414,795 | A | * | 11/1983 | Johnstone et al. ........... 56/340.1 |
| 4,432,190 | A | * | 2/1984 | Orlando ............................ 56/1 |
| 4,621,488 | A | * | 11/1986 | Claxton ......................... 56/330 |
| 4,768,332 | A | * | 9/1988 | Bizzini ........................ 56/340.1 |
| 4,924,666 | A | * | 5/1990 | Poncet .......................... 56/330 |
| 6,178,730 | B1 | * | 1/2001 | Visser .......................... 56/340.1 |
| 7,543,436 | B2 | * | 6/2009 | Scott et al. ................... 56/328.1 |

* cited by examiner

*Primary Examiner* — Arpad Fabin-Kovacs
(74) *Attorney, Agent, or Firm* — Michael G. Harms

(57) ABSTRACT

The invention relates to a fruit-harvesting machine including a motorized support structure (1) and a harvesting assembly mounted on the structure by a suspension frame (2), the harvesting assembly comprising two shaker devices adapted to detach the harvest from the plant stocks and a system for recovering the detached harvest, the shaker devices delimiting transversely between them a harvesting space into which the stocks to be shaken are introduced successively to move in the space between a front opening and a rear opening of said space, wherein the suspension frame (2) includes a rear part (6a) that is mounted on the support structure (1) with at least one degree of freedom in the transverse direction, a front part (5a) of the frame being mounted on the support structure (1) enabling transverse displacement of the rear part relative to the front part.

14 Claims, 4 Drawing Sheets

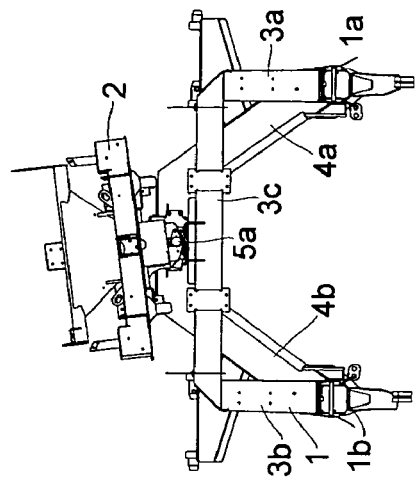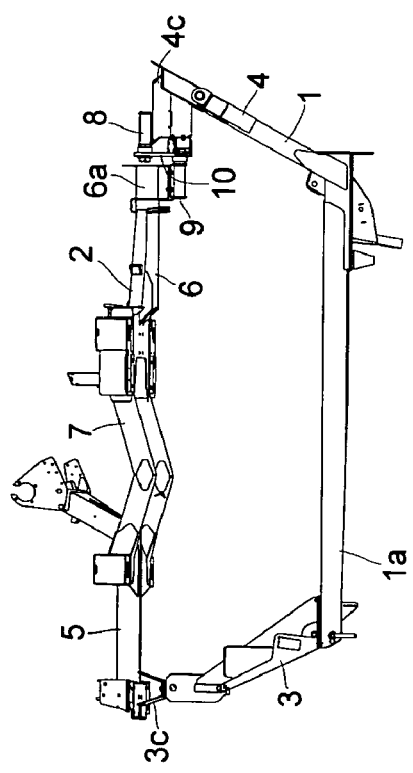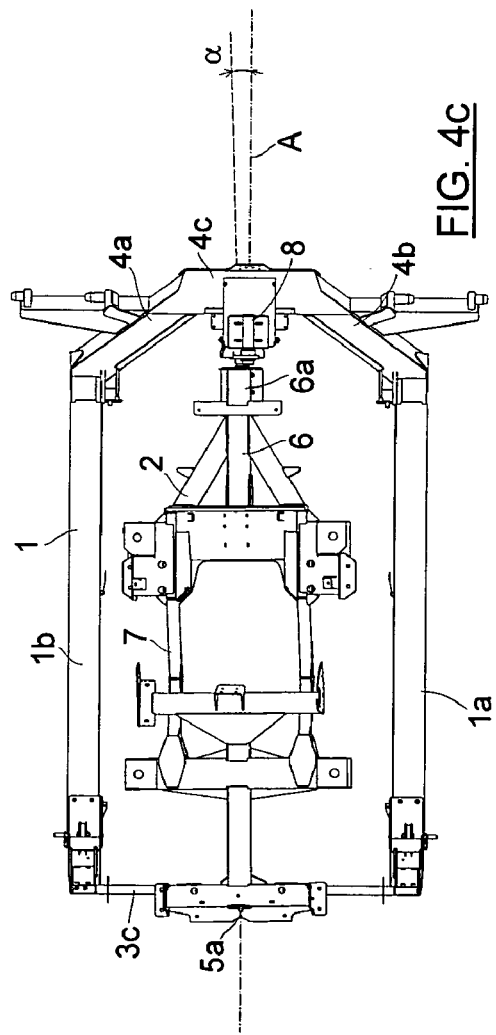
FIG. 4a
FIG. 4b
FIG. 4c

FRUIT HARVESTING MACHINE HAVING A MOTORISED SUPPORT STRUCTURE AND SUSPENSION FRAME

BACKGROUND OF THE INVENTION

The invention relates to a fruit-harvesting machine comprising a motorised support structure and a harvesting assembly mounted on said structure by means of a suspension frame.

The invention is applied in particular to the mechanised harvesting of fruit growing on trees or bushes planted in rows, such as grapes, berries, coffee berries, olives and other fruit, in particular fruit growing in bunches.

Conventionally fruit is harvested by a harvesting assembly straddling at least one row of plants and being moved along said row. The harvesting assembly comprises a recovery system that is operable to convey the flow of harvested material inside the machine in order to, where appropriate after cleaning and/or sorting, to store it in at least one hopper provided for this purpose or in an associated trailer.

The harvesting assembly also comprises two shaker devices that are operable to detach the harvest from the plant stocks, said shaker devices delimiting transversely between them a harvesting space into which the stocks to be shaken successively are introduced to travel through said space between a front opening and a rear opening of said space.

In particular, the longitudinal dimension of the harvesting space is adapted to receive more than one, in particular two, plant stocks in said space in order to shake them over a distance greater than the spacing between the stocks in the row.

However, the harvesting space can then contain two stocks whose aggregate transverse dimension (the transverse separation between their outwardmost edges) is greater than the available transverse dimension of the harvesting space. The transverse dimension of the harvesting space is defined by the separation between the two shaker devices and the alignment of the stocks in a row is not perfect.

As a result each of the shaken stocks therefore exerts an opposite lateral force on the respective shaker device, which places a high mechanical load on said devices and makes shaking less efficient.

SUMMARY OF THE INVENTION

The invention aims in particular to solve the problems referred to above by proposing a fruit harvesting machine in which the harvesting space has a higher tolerance to misalignment of the plant stocks in a row to be harvested.

To this end, the invention proposes a fruit harvesting machine comprising a motorised support structure and a harvesting assembly mounted on said structure by means of a suspension frame, said harvesting assembly comprising two shaker devices operable to detach the harvest from the plant stocks and a system for recovering the detached harvest, said shaker devices delimiting transversely between them a harvesting space into which the stocks to be shaken are introduced successively to move in said space between a front opening and a rear opening of said space, the suspension frame comprising a first longitudinal end part that is mounted on the support structure with at least one degree of freedom in the transverse direction, a second longitudinal end part of said frame being mounted on the support structure enabling transverse displacement of said first longitudinal end part relative to said second longitudinal end part.

The first longitudinal end part may be a rear part and the second longitudinal end part may be a front part, or vice versa.

BRIEF DESCRIPTION OF THE DRAWINGS

Other objects and advantages of the invention will become apparent in the course of the following description of a particular embodiment, which is given with reference to the appended Figures, in which:

FIG. 4 is analogous to FIG. 3, showing the assembly in a position constrained in the other direction.

DETAILED DESCRIPTION OF THE INVENTION

Figure 1A:
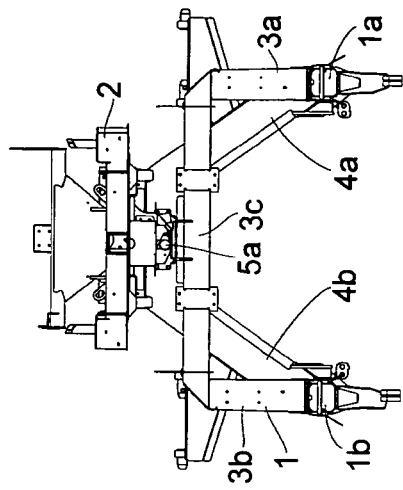
FIG. 1 shows views of a suspension frame in a stable position for assembly on the support structure, respectively from the side (FIG. 1a), from the front (FIG. 1b) and from above (FIG. 1c)
Figure 1B:
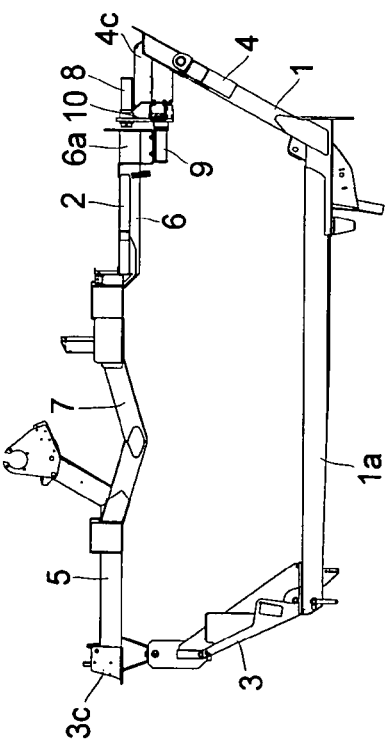
Figure 1C:
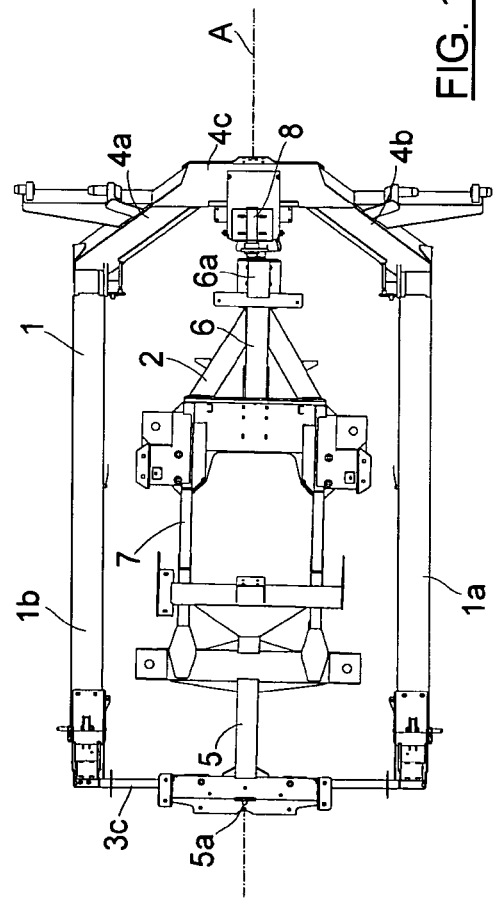
Figure 3B:
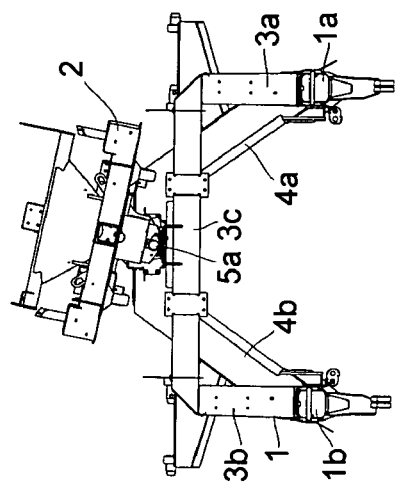
FIG. 3 comprises views analogous to FIG. 1, showing the assembly in a position constrained in one direction away from to the stable position.
Figure 3A:
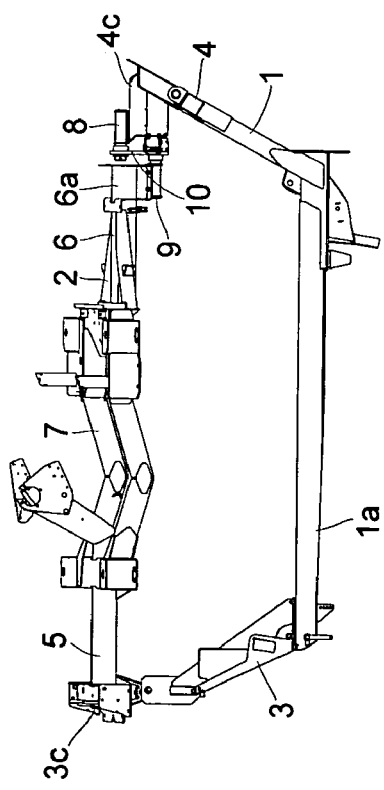
Figure 3C:
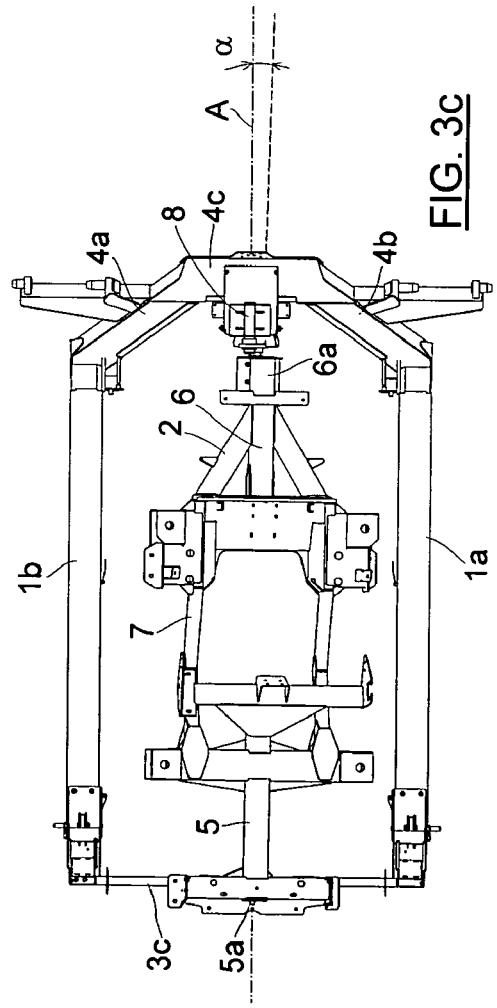

In the context of this description and the claims, spatial position terms are defined, with respect to FIGS. 1c, 3c and 4c, relative to the direction of normal operational movement of the machine: "front" and "rear" respectively on the left and on the right in these Figures, "left" and "right" respectively at the bottom and at the top in these Figures, "transverse" extending between "left" and "right", and "longitudinal" extending between "front" and "rear".

The invention relates to a fruit harvesting machine, in particular for mechanised harvesting of fruit growing on trees or bushes planted in rows, such as grapes, berries, coffee berries, olives and other fruit, in particular fruit growing in bunches. The machine is intended more particularly for harvesting olives.

The harvesting machine comprises a motorised support structure and a harvesting assembly (not shown) mounted on said structure by means of a suspension frame 2. In the Figures, the support structure comprises an intermediate frame 1 on which the suspension frame 2 is mounted, said intermediate frame being removably mounted on a motorised vehicle.

To be more precise, the intermediate frame 1 has two lower longitudinal members 1a, 1b on the left and on the right, respectively, the ends of said longitudinal members being joined by an inverted U-shaped structure 3, 4 at the front and at the rear, respectively. The branches 3a, 3b, 4a, 4b of the U-shaped structures 3, 4 are fixed to an end of a respective longitudinal member 1a, 1b and the cross members 3c, 4c of said structures extend in a horizontal plane located above said longitudinal members.

The suspension frame 2 comprises a front beam 5, a front part 5a of which is mounted on the upper front cross member 3c, and a rear beam 6, a rear part 6a of which is mounted on the upper rear cross member 4c, said beams being aligned in a horizontal plane. Thus the harvesting assembly is suspended in the upper part of the support structure 1. Furthermore, the suspension frame 2 comprises a platform 7 for mounting the harvesting assembly (not shown) to which a beam 5, 6 is fixed on each end.

In the embodiment represented, the front beam part 5a and the rear beam part 6a are mounted on the support structure 1 with one degree of freedom in rotation about a longitudinal axis A. Accordingly, by rotation of the suspension frame 2 about this axis A, the harvesting assembly is able to swing relative to the support structure 1 as guided by a row of plants, which is favourable to the successive introduction of the plant stocks into the harvesting space.

The harvesting assembly conventionally comprises two shaker devices that are arranged to detach the harvest from the plant stocks and a system for recovering the detached harvest. A shaker device is fixed to each side of the platform so that they delimit transversely between them a harvesting space into which the successive stocks to be shaken are introduced and move between a front opening and a rear opening of said space as the machine travels over the plant row.

In particular, the harvesting space has a substantially rectangular section, the openings being formed on the shorter sides and the longer sides being delimited by a respective shaker device. Furthermore, the longitudinal dimension of the harvesting space is such that more than one, in particular two, plant stocks from the same row can be introduced therein for shaking them. In one embodiment, the recovery system comprises two bucket conveyors for recovering the detached harvest under the harvesting space and conveying said harvest into the upper part of the harvesting machine.

Furthermore, the harvesting machine can comprise a system for cleaning and/or sorting the streams of harvest fed by the bucket conveyors to eliminate components other than fruit, in particular leaves and wood particles.

The rear part 6a of the rear beam 6 of the suspension frame 2 is mounted to the rear cross member 4c of the support structure 1 with at least one degree of freedom in the transverse direction. In particular, this degree of freedom allows free transverse movement, in particular non-motorised movement, of the rear part 6a relative to the cross member 4c.

Moreover, the front part 5a of the front beam 5 of the suspension frame 2 is mounted in a bearing on the front cross member 3c of the support structure 1, the bearing allowing for the transverse movement of the rear part 6a relative to said front part. In particular, the transverse displacement of the rear beam part 6a is very much greater than that of the front beam part 5a, especially as the transverse displacement of the front part 5a is substantially zero.

Accordingly, as shown in FIGS. 3 and 4, the rear part 6a is slewed relative to the front part 5a so that the longitudinal axis of the harvesting space is able to take up an angle α relative to the direction of movement of the stocks through the harvesting space, i.e. relative to the rotation axis A in the stable position (FIG. 1c). Furthermore, this slewing angle α is a result of the stocks bearing on the shaker devices, which limits the resulting mechanical loads and thus makes shaking more efficient.

In particular, if two successive plant stocks are misaligned with an aggregate transverse separation between their exterior edges that is greater than the transverse dimension of the harvesting space, the forces exerted by the stocks on the shaker devices induce a slewing angle α for the rotation axis of the suspension frame 2 so as to adapt the harvesting space as a function of the configuration of said stocks. Furthermore, the suspension frame 2 being mounted in the upper part of the support structure 1, the lever arm between the rotation axis A and the shaker devices facilitates the taking of this slewing angle α.

According to an alternative embodiment, which is not shown, the assembly may be operable to slew the front part 5a with respect to the rear part 6a. To realise this, the front part 5a may constitute the first longitudinal end part and the rear part 6a then constitutes the opposite, second longitudinal end part. Accordingly, the front part 5a is mounted on the support structure 1 while providing at least one degree of freedom in the transverse direction, and rear part 6a is mounted on the support structure 1 by a bearing allowing the transverse displacement of the front part 5a relative to the rear part 6a.

Figure 2A:
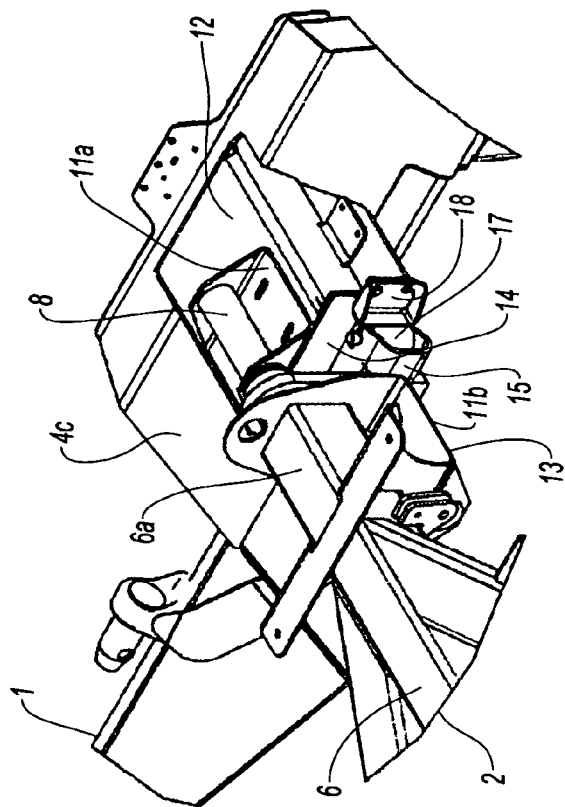
FIG. 2 shows enlarged perspective views of the embodiment of FIG. 1, showing the mounting of the rear part of the suspension frame on the support structure, respectively before (FIG. 2a) and after (FIG. 2b) assembly.
Figure 2B:
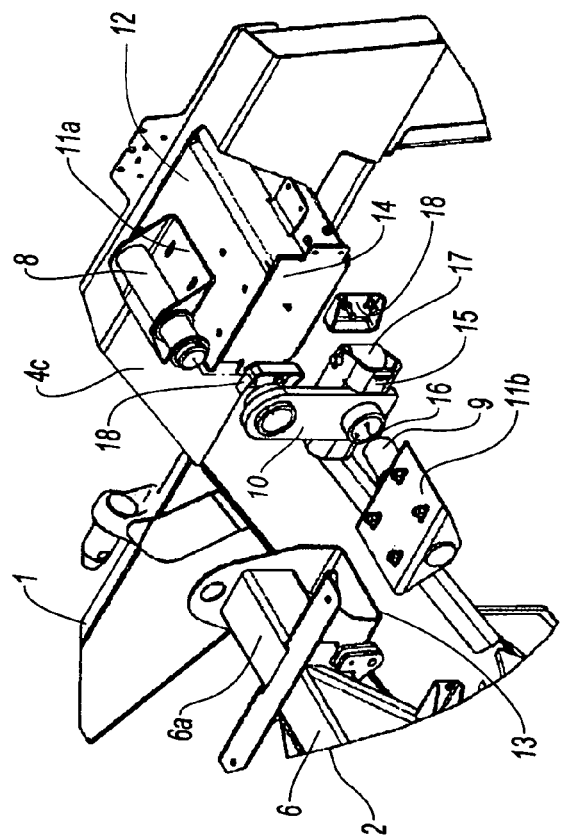

Furthermore, one may also envisage mounting also the second longitudinal end part on the support structure while providing at least one degree of freedom in the transverse direction, in particular by applying the assembly according to FIG. 2 to said second longitudinal end part also.

In the embodiment shown, the front part 5a has a longitudinal axis pivot connection to the support structure 1, said pivot being mounted with play on said structure so as to enable the movements of the rear part 6a. Alternatively, the front part 5a can be mounted on the support structure 1 via a ball joint.

There is described hereinafter with specific reference to FIG. 2 the mounting of the rear part 6a on the support structure 1 by means of two longitudinal axis pivots 8, 9 that are parallel to the rotation axis A of the suspension frame 2, said pivots being superposed and fastened to the support structure 1 and the rear part 6a, respectively. Furthermore, the pivots 8, 9 are interconnected by a link 10 which takes a vertical position under gravity in the absence of mechanical loading on the shaker devices.

Thus, after taking up an angle α to accommodate the particular configuration of two adjacent stocks, the suspension frame 2 can return freely to its stable position (FIG. 1) in which the harvesting space extends longitudinally in the direction of the harvester movement relative to the plant stocks.

In the embodiment shown, the axis of the lower pivot 9 is free to trace a circular arc to either side of the stable position, the resulting displacement of the rear part 6a thus having a transverse component and a vertical component. The mounting of the rear part 6a on the support structure 1 is therefore such that transverse displacement of said rear part raises said rear part relative to said support structure.

In particular, this raising is symmetrical with respect to the stable central position of the rear part 6a. Moreover, the suspension frame can pivot about the axis A on displacement of the rear part 6a (see in particular FIGS. 3b and 4b).

Each pivot 8, 9 is carried by a plate 11a, 11b, the plate 11a of the upper pivot 8 being fixed onto a top support surface 12 of the cross member 4c and the plate 11b of the lower pivot 9 being fixed to a bottom support surface 13 of the rear part 6a. Furthermore, the top support surface 12 is extended by a front transverse surface 14 and the axis of the lower pivot 9 carries a device for restraining the displacement of the rear part 6a on said transverse front support surface.

In the embodiment represented, the restraining device comprises a plate 15 provided with a central orifice 16 for connection to the lower pivot 9. Furthermore, the plate 15 carries on either side of the orifice 16 a guide roller 17 that bears against the transverse front support surface 14.

Moreover, the transverse front support surface 14 is provided with two stops 18 for limiting the amplitude of the movement of the guide device on said support surface. Thus the amplitude of the transverse displacement of the rear part 6a of the suspension frame 2 is delimited by the gap between the two stops 18.

In a manner, which is not illustrated, the rear part 6a can be mounted in a transverse opening on the support structure 1, said opening comprising means for positioning the rear part 6a in a central stable position.

In one embodiment, the edges of the opening are curved upwardly to provide a central area of stable positioning of the rear part 6a. Accordingly, as in the embodiment shown, the displacement of the rear part 6a has a transverse component and a vertical component.

In another embodiment, the opening can extend only transversely and be equipped with springs that exert a force on each side of the rear part 6a to form means for positioning said rear part in a central stable position.

The invention claimed is:

1. A fruit harvesting machine comprising a motorised support structure (1) having a longitudinal axis and a harvesting assembly mounted on said structure by means of a suspension frame (2), said harvesting assembly comprising two shaker devices, each shaker device is mounted on either side of the longitudinal axis, the shaker devices are operable to detach the harvest from the plant stocks and a system for recovering the detached harvest, said shaker devices delimiting transversely between them a harvesting space into which the stocks to be shaken are introduced successively to move in said space between a front opening and a rear opening of said space, wherein the suspension frame (2) comprises a first longitudinal end part (6a) that is mounted on the support structure (1) with at least one degree of freedom in the transverse direction, a second longitudinal end part (5a) of said frame being mounted on the support structure (1) enabling transverse displacement of said first longitudinal end part relative to said second longitudinal end part, wherein the first longitudinal end part (6a) and the second longitudinal end part (5a) are aligned along the longitudinal axis.

2. A fruit harvesting machine according to claim 1, wherein the longitudinal end parts (5a, 6a) are mounted on the support structure (1) with a degree of freedom in rotation about a longitudinal axis.

3. A fruit harvesting machine according to claim 1, wherein the first longitudinal end part (6a) is mounted on the support structure (1) by a linkage (8, 9, 10) operable to raise said first longitudinal end part relative to said support structure upon transverse displacement of said first longitudinal end part relative to said second longitudinal end part.

4. A fruit harvesting machine according to claim 3, wherein the raising is symmetrical with respect to a central position of the first longitudinal end part (6a).

5. A fruit-harvesting machine according to claim 1, wherein the second longitudinal end part (5a) is mounted with play on the support structure (1).

6. A fruit harvesting machine according to claim 1, wherein the first longitudinal end part (6a) is mounted on the support structure (1) via two longitudinal axis pivots (8, 9), said pivots being superposed and fastened to the support structure (1) and the first longitudinal end part (6a), respectively, said pivots being connected by a link (10).

7. A fruit harvesting machine according to claim 6, wherein the upper pivot (8) is mounted on a top support surface (12) of the support structure (1), the lower pivot (9) being mounted on a bottom support surface (13) of the first longitudinal end part (6a).

8. A fruit harvesting machine according to claim 7, wherein the top support surface (12) is extended by a transverse support surface (14), the axle of the lower pivot (9) carrying a device for guiding displacement of the first longitudinal end part (6a) on said transverse front support surface.

9. A fruit harvesting machine according to claim 8, wherein the guide device comprises at least one roller (17) that bears on the transverse support surface (14).

10. A fruit harvesting machine according to claim 1, wherein the amplitude of the transverse displacement of the first longitudinal end part (6a) is delimited by two stops (18).

11. A fruit harvesting machine according to claim 8, wherein stops (18) are provided on the transverse support surface (14) to limit the amplitude of the movement of the guide device on said support surface.

12. A fruit harvesting machine according to claim 1, wherein the suspension frame (2) comprises a beam (5) carrying the second longitudinal end part (5a) and a beam (6) carrying the first longitudinal end part (6a).

13. A fruit harvesting machine according to claim 12, wherein the suspension frame (2) comprises also a platform (7) and a beam (5, 6) being fixed to either side of the said platform.

14. A fruit harvesting machine according to claim 1, wherein the support structure (1) has a top front cross member (3c) and a top rear cross member (4c) on which are respectively mounted the longitudinal end parts (5a, 6a) of the suspension frame (2).

* * * * *